United States Patent
Tam

(10) Patent No.: US 6,579,400 B1
(45) Date of Patent: Jun. 17, 2003

(54) PROCESS FOR TRANSFERRING AN IMAGE ONTO A SURFACE

(76) Inventor: Chit-Ho Tam, Unit 101-106, 1/F, Block 3, Nan Fung Industrial City, 18 Tin Hua Rd., Tuan Man, N.T., Hong Kong (CN)

( * ) Notice: Subject to any disclaimer, the term of this patent is extended or adjusted under 35 U.S.C. 154(b) by 0 days.

(21) Appl. No.: 09/365,317

(22) Filed: Jul. 30, 1999

Related U.S. Application Data

(63) Continuation-in-part of application No. 09/215,709, filed on Dec. 18, 1998, now abandoned.

(30) Foreign Application Priority Data

Dec. 19, 1997 (CN) .......................................... 97125656 A

(51) Int. Cl.⁷ ................................................. B44C 1/16
(52) U.S. Cl. ........................ 156/240; 156/239; 156/249; 106/31.13
(58) Field of Search ................................ 156/230, 235, 156/239, 240, 247, 249; 106/31.13

(56) References Cited

U.S. PATENT DOCUMENTS

| 3,981,761 | A | * | 9/1976 | Kojima et al. | 156/235 |
| 4,175,151 | A | * | 11/1979 | Eppich et al. | 428/202 |
| 4,337,289 | A | * | 6/1982 | Reed et al. | 428/195 |
| 4,401,470 | A | * | 8/1983 | Bridger | 106/20 |
| 5,560,796 | A | * | 10/1996 | Yoshimura | 156/240 |
| 5,575,877 | A | | 11/1996 | Hale et al. | |
| 5,677,719 | A | | 10/1997 | Grasnow | |

* cited by examiner

Primary Examiner—Richard Crispino
Assistant Examiner—Cheryl N. Hawkins

(57) ABSTRACT

A process is disclosed for non-toxic transfer-printing of images onto a surface of a workpiece. The patterns or characters to be printed are first formed on a transferring medium using a non-toxic ink, and then the non-toxic ink patterns or characters are separated form the transferring medium with water and placed on the workpiece, which is then fixed so that the patterns or characters are transferred onto the workpiece surface firmly.

10 Claims, No Drawings

PROCESS FOR TRANSFERRING AN IMAGE ONTO A SURFACE

CROSS-REFERENCE TO RELATED APPLICATIONS

This application is a continuation-in-part of U.S. patent application Ser. No. 09/215,709, filed on Dec. 18, 1998, now abandoned, which is hereby incorporated herein in its entirety by reference.

FIELD OF THE INVENTION

The present invention relates to a process for printing patterns or characters on a surface of a workpiece, and particularly to a process for printing patterns or characters on a surface using non-toxic ink.

BACKGROUND OF THE INVENTION

Conventionally, silk screen printing or transfer-printing is used to print patterns or characters on a surface of a workpiece, such as a metallic or plastic surface.

However, both of these methods have some disadvantages. Silk screen printing can only be practiced on a flat surface. Transfer printing has the disadvantages of having a small printing area, having a great printing distortion, particularly in the form of dots (bites) when used for large area printing. Also, the operation of transfer printing is complicated, and the equipment cost is high.

In addition to the aforementioned processes, patterns or characters can be put onto a surface using a self adhesive or heat transferable decal.

However, these two methods also have some disadvantages. A self adhesive decal may not meet the relevant international test standards, such as the EN71 standard in Europe, or the ASTM standard in the U.S. Heat transferable decals have a number of disadvantages, namely that the transfer temperature is unacceptably high, the decal is not easily handled and so locating it on a complicated surface before the transfer process is difficult, and that the available heat transferable decals have as carriers a film which must be peeled off after transfer, resulting in scarps (wrinkles) and defects caused by the print adhering to the film.

Therefore, there is still need in the art for an improved process for transferring images or patterns onto a surface.

SUMMARY OF THE INVENTION

The present invention is aimed at solving the above drawbacks present in the conventional processes. Accordingly, one object of the present invention is to provide a new process for printing patters or characters on a surface of a workpiece using non-toxic ink, comprising forming the patterns or characters to be printed on a transferring medium using non-toxic ink; separating the printed patterns or characters from the transferring medium with, e.g., water; placing the patterns or characters onto the surface of a workpiece; and fixing the patterns or characters to the surface of the workpiece.

The process according to the present invention can be used to print patterns or characters on a large area and/or on an irregular or even grooved surface. Additionally, its operation is simple, the equipment cost is low and flexibility is high.

The foregoing and other advantages and features of the invention, and the manner in which the same are accomplished, will become more readily apparent upon consideration of the following detailed description of the invention taken in conjunction with the accompanying examples, which illustrate preferred and exemplary embodiments.

DETAILED DESCRIPTION OF THE INVENTION

The object of the present invention is achieved by the following process: the patterns or characters to be printed using a known non-toxic ink are first formed on a transferring medium, which is generally flat, e.g. through spraying, painting, printing, brushing or typing.

The transferring medium is preferably water transferring paper. Any conventional water transferring paper known in the art can be used for purpose of this invention. The non-toxic ink comprises resin, solvent and additive components. Examples of suitable resins are nitrolacquer and polyester resin. Examples of suitable solvents are acetic ether, butyl acetate, N-butyl alcohol, isophorone, toluene and xylene. Examples of suitable additives are conventional pigments and plasticizers.

It is preferred that the non-toxic ink has a composition of about from about 10 to about 20 percent, preferably about 14 to about 18 percent, more preferably about 15 to about 17 percent by weight resin, from about 42 to about 65 percent preferably from about 47 to about 60 percent, more preferably about 50 to about 56 percent by weight solvent, and from about 24 percent to about 40 percent, preferably 27 percent to about 37 percent by weight of additives.

Preferably, the non-toxic ink composition comprises from about 4% to about 6% of nitrolacquer; from about 8% to about 12% of polyester resin; from about 49% to about 58% of solvent comprising at least one selected from the group consisting of acetic ether, butyl acetate, N-butyl alcohol, isophorone, toluene, and xylene; from about 20% to about 34% of pigment such as titanium white; and from about 1% to about 3% of plasticizer. From about 2% to about 4% by weight of a conventional dispersing agent can also be added. Dispersing agents are well known in the art. Examples include, e.g., sodium silicate, polyphosphates, lignin derivatives, etc. Other agents such as thinner for printing, e.g., methyl isobutyl ketone can also be added. As will be apparent to skilled artisans, the above mentioned chemicals are typically commercially available, e.g., from Union Carbide Company, Lu Zhou Chemical Factory, PRC, BYK-Chemie GmbH, SCM Company, U.S.A., and many other chemical companies.

The non-toxic ink composition can be formed by any conventional manners. For example, when nitrolacquer and polyester resin are used as the resin component, the composition may be prepared by dissolving nitrolacquer in a portion of the solvent, and tempering this with the plasticizer and a dispersion of the polyester resin and pigment in the remaining solvent. The tempered composition can then be purified to produce the finished non-toxic ink composition.

The patterns or characters formed by the non-toxic ink on the transferring medium become stable after about 3 hours and are then peeled off from the transferring medium with water to form a decal, i.e., a stabilized pattern or character ready to be transferred onto a workpiece.

The decal is then placed on the surface of a workpiece, optionally using a template to accurately place the patterns or characters on the workpiece. The workpiece surface to be printed can be any surface, including an untreated or treated metal or non-metal surface or an irregular or flat surface.

The decal on the workpiece may optionally be dried by cloth or soft paper to ensure that no gas or water is trapped between the decal and the workpiece. At this stage the decal is temporarily adhered to the workpiece. The patterns or characters are then firmly adhered to the workpiece by fixing.

The fixing step is conducted to firmly adhere the decal, i.e., the character, pattern, or image, to the surface of the workpiece. That is to say, after fixing, the decal should adhere to the workpiece surface for a sufficient time such that the purposes of ordinary use of the printed pattern on the workpiece can be achieved. Preferably, the pattern or character should adhere to the workpiece surface for at least the ordinary useful life of the workpiece. The fixing may be carried out at a temperature in the range of from room temperature to about 150° C. for a sufficient time such that the pattern or character firmly adheres to the workpiece surface.

The choice of fixing temperature and duration is dependent upon the thermal stability of the workpiece surface. If the fixing step is carried out at room temperature, firm adherence of the pattern or character is achieved in about 24 to 48 hours. The transfer of the decal to the workpiece can be accelerated by subjecting the workpiece with the attached decal to a higher temperature above room temperature. Workpiece surfaces such as glass, ceramic or china can be treated at less than about 110° C. (e.g. with boiled water) for about 1 to about 120 minutes and firm adherence of the decal is produced upon cooling to room temperature. Metallic workpiece surfaces can be heated at from, e.g., about 60° C. to about 100° C., preferably at about 90° C. for about 1 to about 60 minutes, preferably about 5 to about 30 minutes to provide firm adherence of the pattern or character to the workpiece. Workpiece surfaces such as plastic e.g. ABS plastic, wood and fiberglass can be heated at about 40° C. to about 90° C., preferably about 80° C. for about 30 minutes to provide firm adherence. Generally, notwithstanding the above, temperature and heating time outside the above ranges may also be effective so long as the workpiece surface is not adversely affected.

For workpiece surfaces that cannot be heated directly, hot air e.g. from a hair drier, can be blown onto the decal attached to the workpiece to accelerate adherence. Sunlight may be used to shine on the decal and the workpiece surfaces which may be damaged by the other drying methods mentioned above to provide firm adherence in from about 2 to about 15 hours, preferably from about 5 to about 12 hours.

The temperature and the length of time are correlated with each other. Generally, if the temperature the decal and work piece surface are subjected to is higher, the time required to achieve firm adherence should be shorter. Conversely, if the temperature the decal and work piece surface are subjected to is lower, the time required to achieve firm adherence should be longer. Some minor degree of experimentation may be required to determine the optimal temperature and time, this being well within the capability of one skilled in the art once apprised of the present disclosure.

Compared with conventional silk screen printing, the inventive process can be effectively used on an irregular surface as well as a flat surface, and the drawbacks present in the conventional transfer-printing process, such as image distortion, bites when used for large area printing, complicated operation and high equipment cost, can be overcome.

EXAMPLES

The process according to the present invention will be further described in conjunction with the following embodiments.

Example 1

The predetermined patterns or characters were first formed on a transferring medium through spraying, painting, printing, brushing or typing using a non-toxic ink of the following composition (by weight):

| Resin component | 5.1% nitrolacquer, 10.2% polyester resin |
|---|---|
| Solvent component | 7.89% acetic ether, 10.51% butyl acetate, 10.51% N-butyl alcohol, 6.84% isophorone, 6.31% toluene, 10.51% xylene |
| Additive component | 30.6% pigment, 1.53% plasticizer |

The transferring medium was a water transferring paper.

The non-toxic ink patterns or characters on the medium were then peeled off from the transferring medium by water and stuck on the surface of a zinc alloy die cast workpiece with the aid of a template to allow the exact positioning of the decal.

The decal was then dried by a cloth or soft paper to ensure that no gas or water is trapped in between the decal and zinc alloy workpiece. The decal was then temporarily adhered to the surface of the workpiece.

Finally, the surface with the decal on it was heated at about 90° C. (but not more than 100°) for 20 minutes. The non-toxic ink patterns or characters was firmly printed on the surface of the zinc alloy workpiece. The printed patterns or characters reached the relevant international standards, such as the EN71 standard in Europe, and the ASTM standard in the U.S.

Example 2

The process according to Example 1 was repeated with the exception that the adherence of the decal on the zinc alloy workpiece was carried out at room temperature from 24 to 48 hours. The resulting patterns or characters are in conformity with the requirements of the relevant international standards detailed in Example 1.

Example 3

The process according to Example 1 was repeated with the exception that the adherence of the decal on the zinc alloy workpiece was carried out in sunlight for 5 to 12 hours. The resulting patterns or characters are in conformity with the requirements of the relevant international standards detailed in Example 1.

Example 4

The process according to Example 1 was repeated for workpieces in the form of utensils made of ceramic, glass and china, with the exception that the adherence of the decal on the workpiece was carried out by pouring boiling water on the utensil. The patterns or characters were found to have firmly adhered to the utensil when the water had cooled to room temperature. The resulting patterns or characters are in conformity with the requirements of the relevant international standards detailed in Example 1.

Example 5

The process according to Example 1 was repeated on workpieces formed of plastic, wood and fiberglass, with the exception that the adherence of the decal on the workpiece was carried out at 80° C. for 30 minutes. The resulting patterns or characters are in conformity with the requirements of the relevant international standards detailed in Example 1.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A process for transfer-printing a pattern or character onto a surface of a workpiece, comprising;

forming a pattern or character to be printed directly upon a transferring medium using a heat-curable ink;

separating the printed pattern or character from the transferring medium with water;

placing the pattern or character onto a surface of a workpiece; and fixing the pattern or character onto the surface of the workpiece at a temperature from about room temperature to about 150° C.;

wherein said heat-curable ink comprises, by weight, about 4–6% nitrolacquer, about 8–12% polyester resin, about 49–58% of solvent selected from the group consisting of acetic ether, butyl acetate, N-butyl alcohol, isophorone, toluene, and xylene, about 20–34% pigment, and about 1–3% plasticizer.

2. The process of claim 1, wherein said step of forming a pattern or character is conducted by spraying, painting, printing, brushing or typing.

3. The process of claim 1, wherein said surface of the workpiece is flat or irregular.

4. The process of claim 1, wherein said surface of the workpiece is formed of glass, ceramic, metal, wood, china, fiberglass, or plastic.

5. The process of claim 1, wherein said surface of the workpiece is formed of zinc alloy.

6. The process of claim 1, wherein said fixing step is conducted at room temperature for about 24 to about 48 hours.

7. The process of claim 1, wherein said fixing step is conducted at a temperature of from above room temperature to about 100° C.

8. The process of claim 1, wherein the fixing step is conducted under sunlight.

9. The process of claim 1, wherein the fixing step is conducted by subjecting said workpiece surface to hot air.

10. The process of claim 1, wherein said transferring medium is a water transferring paper.

* * * * *